Oct. 8, 1963  G. A. FAIRBAIRN  3,106,053
ENDLESS CHAIN CUTTERS FOR HARVESTERS, MOWERS
AND OTHER AGRICULTURAL IMPLEMENTS
Filed July 18, 1960  2 Sheets-Sheet 1
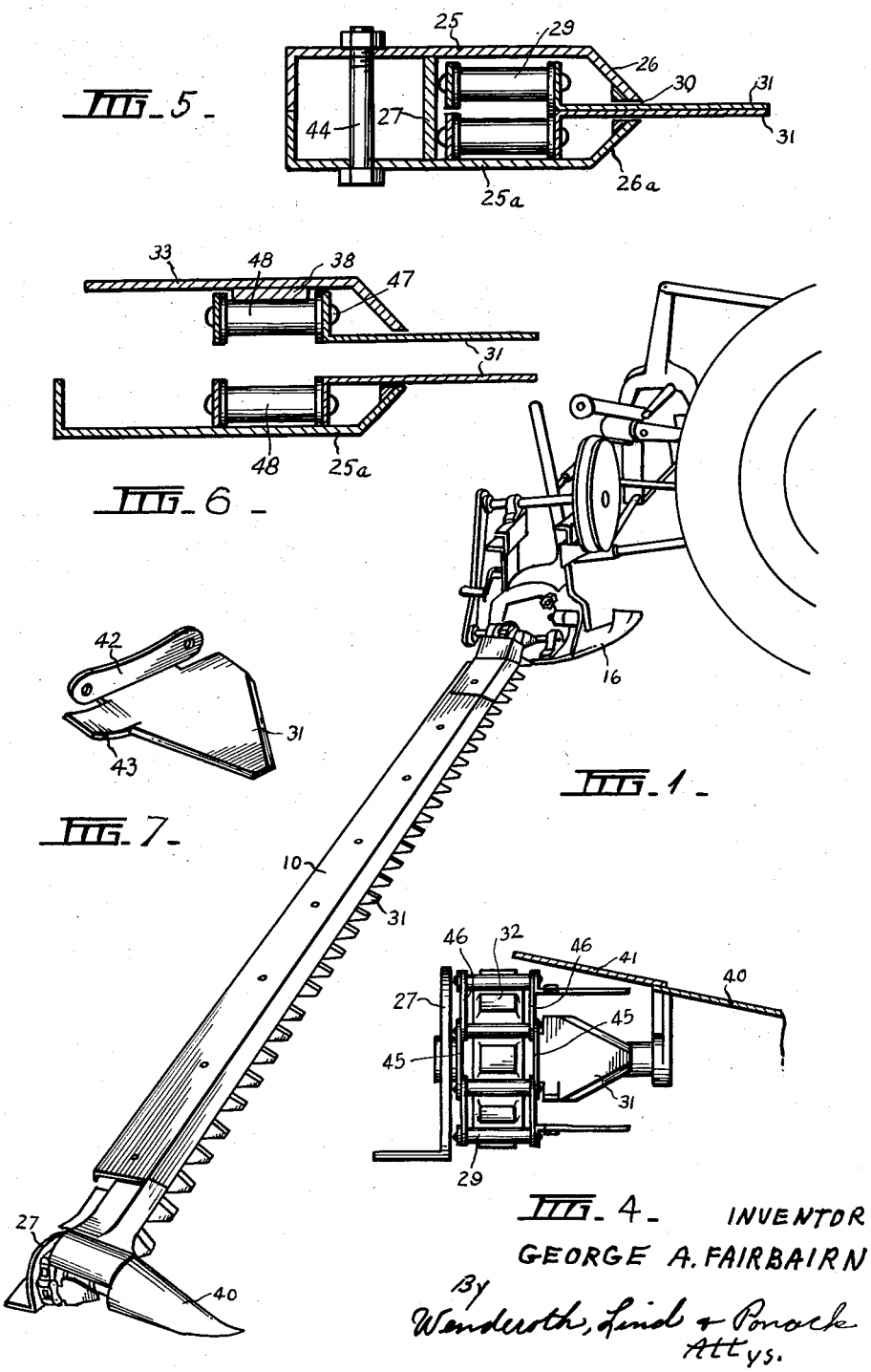
INVENTOR
GEORGE A. FAIRBAIRN
By Wendoroth, Lind & Ponack
Attys.

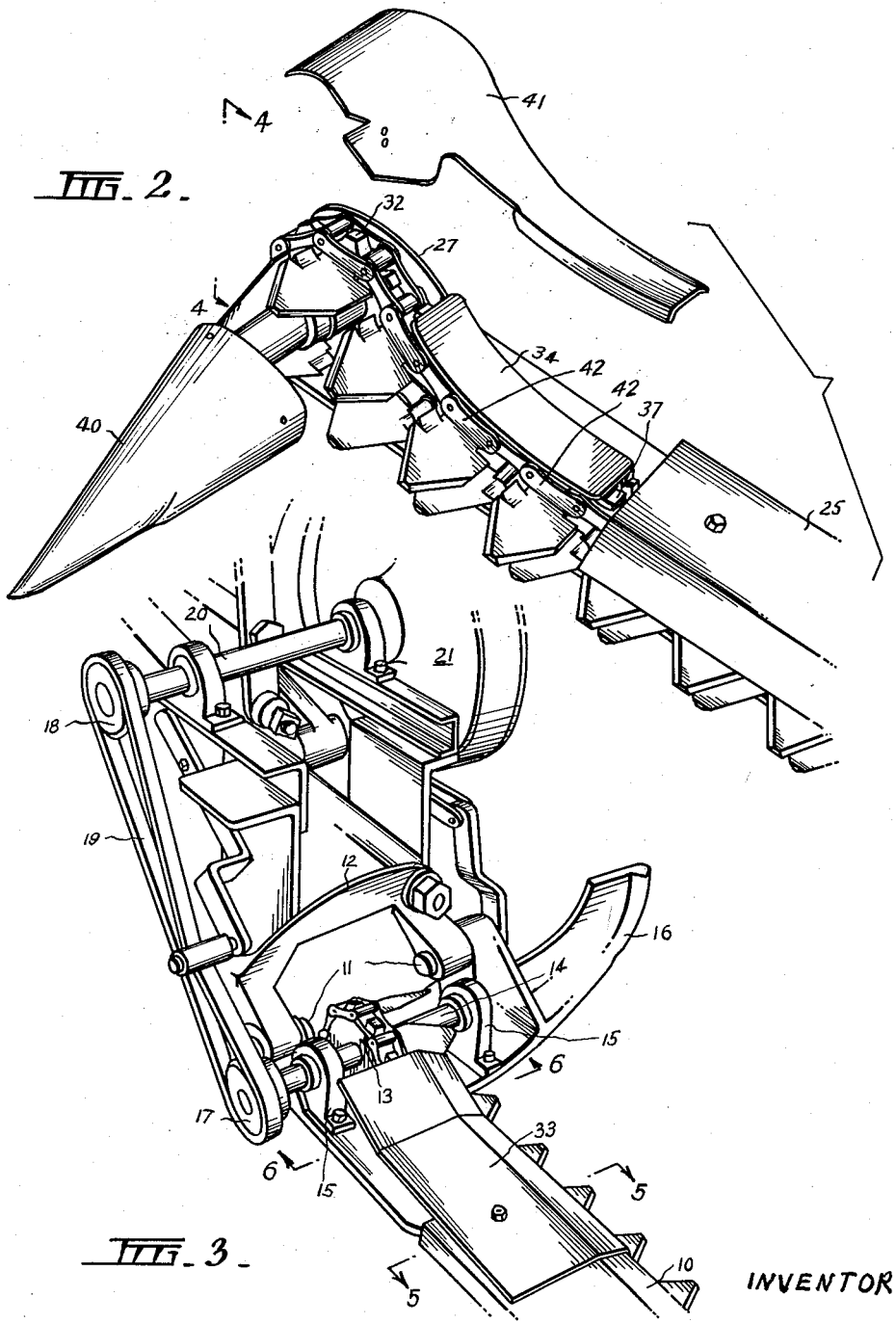

United States Patent Office 3,106,053
Patented Oct. 8, 1963

3,106,053
ENDLESS CHAIN CUTTERS FOR HARVESTERS, MOWERS AND OTHER AGRICULTURAL IMPLEMENTS
George Anthony Fairbairn, Mountain Creek Estate, Albury, New South Wales, Australia
Filed July 18, 1960, Ser. No. 43,622
Claims priority, application Australia July 22, 1959
6 Claims. (Cl. 56—291)

This invention relates to endless chain cutters for harvesters, mowers and other agricultural machines or implements, and is particularly directed to endless chain cutters for pasture mowers.

In one known type of endless chain cutter, one flight of the chain co-operates with a plurality of fixed fingers to effect the cutting of the grass. These fixed fingers are substantially identical with those used on the conventional mower of the reciprocating cutter type, and as in all the known machines, the fingers have a two fold purpose, i.e., one to co-operate with the cutter blades to effect the cutting of the grass, and the other to prevent the entry of stones and the like into the path of the cutter blades and the resultant damage thereto.

Endless chain cutters are also known wherein the two flights of the chain are guided so that the cutter blades on the respective flights co-operate in a cutting action, but it has been necessary to also provide conventional fingers which do not take part in the cutting action but act solely as guards for the cutter to prevent the entry of stones and the like. However the provision of these protective fingers results in a substantially reduced efficiency as they reduce the number of cutter blades exposed to the grass at any one time and consequently reduce the amount of grass being cut at that time.

It is therefore the principal object of the present invention to provide an endless chain cutter for the purpose specified having the characteristic that it can be operated effectively to cut crop or material to be harvested without the necessity of protective fingers and without damage to cutter blades.

With the above stated principal objective in view there is provided, according to the present invention, an endless chain cutter for harvesters, mowers or other agricultural implements comprising a support for lateral or transverse connection to an implement, a terminal sprocket journalled in and adjacent to each end of the support upon parallel horizontal axes, an endless high speed roller chain extending around and driven by said sprockets, cutters projecting outwardly at spaced intervals from the links forming said roller chain, and means to guide the upper and lower flights of the chain in a parallel relation for a major portion of the distance between the sprockets so that the cutter blades on the respective flights traverse each other in contact to effect the cutting operation.

Conveniently the lower flight of the roller chain is horizontal and tangential in respect of the sprockets, and the upper flight is constrained by guides disposed adjacent to each sprocket to travel parallel with, and sufficiently close to the lower flight that the cutters, travelling in opposite directions, are in wiping contact to effect the cutting of the grass or the like.

By using a high speed precision roller chain it is possible to operate the cutter at a considerably higher linear speed than was previously possible with other type of chain, and as a result of this increased speed any obstacles, such as stones, are thrown clear when contacted by the cutter blade and not caught therein.

Conveniently, the cutter blades are provided on each alternate link of the chain whereby, with the increased speed of the chain, the grass can still enter between the cutter blades on the respective flights of the chain.

The invention will be more readily understood from the following description of one practical arrangement of the endless chain cutter as illustrated in the accompanying drawings.

In the drawings:
FIGURE 1 shows a pasture mower incorporating the endless chain cutter;
FIGURE 2 is an enlarged perspective view of the outer end of the pasture mower, with portion of the chain guard removed;
FIGURE 3 is an enlarged perspective view of the inner end of the mower which is attached to the tractor;
FIGURE 4 is a view in direction 4—4 in FIGURE 2;
FIGURE 5 is a section along line 5—5 in FIGURE 3;
FIGURE 6 is a section along line 6—6 in FIGURE 3;
FIGURE 7 is a detail view of a portion of the chain having the cutter blade integral with a link of the chain.

The transverse support member 10 is pivotally connected by pins 11 to the support frame 12 attached to the chassis or tool bar of the tractor.

The inner sprocket 13 is mounted on the shaft 14 journalled in bearings 15 carried on the skid 16 attached to the support member 10. The shaft 14 is drive coupled by the pulleys 17 and 18 and the belt 19 to counter shaft 20 which is in turn driven by the pulley 21 from the power take-off of the tractor.

The support member 10, over a major portion of its length, comprise a pair of substantially channel members 25 and 25a with one flange 26 of each member inclined outwardly with respect to the web. The two channel members are bolted together by bolt 44 with a spacer member 27 positioned between the webs so as to form a casing through which the two flights of the roller chain 29 can pass. The inclined flanges are of such a length that when the two channel members are assembled a slot 30 is provided through which the cutter blades 31 on each flight of the roller chain project.

The spacer 27 is positioned so as to act as a rear guide for the flights of the chain and determine the extent to which the cutter blades extend through the slot.

The outer sprocket 32 is journalled in an extension of the spacer member 27 and both the inner and outer sprockets are positioned relative to the lower channel member 25a so that the lower flight of the roller chain 29 is maintained in a tangential relation to each sprocket. An upwardly curved guide 33 and 34 is provided at the inner and outer ends respectively of the suport member to guide the top flight of the chain from the top of the sprockets downwardly to move parallel to the lower flight with the cutter blades in wiping contact. A track 37 is provided on the under side of the outer guide 34 which contacts the rollers of the chain in rolling engagement. A similar track 38 (FIGURE 6) is provided at the inner end.

A substantially conical shaped guard 40 disposed forwardly of the outer sprocket and an arched guard 41 are provided to prevent grass from becoming entangled in the outer sprocket 32.

The cutter blade 31 is preferably made integral with the one side member 42 of each alternate link of the chain as shown in FIGURE 7. The chain 29 is an endless chain and as best shown in FIGURES 4, 5 and 6, is what is commonly known as a precision roller chain consisting of pairs of outer links 45 connected together by pairs of inner links 46, the connection being a pivotal connection through pins 47, on which pins are mounted for rotation rollers 48, which rollers extend between the opposed faces of the links of each pair of inner links 46, and as shown in FIGURES 4 and 7, the side members 42 of the links with which the cutter blades 31 are integral, are the side members of the outer links 45, that is to say one of the two side members 42 of each pair of outer links 45 has a cutter blade 31 formed integrally therewith. The blade is also provided with an upwardly curved portion 43 on its leading edge which will guide the blade, as it comes off the sprocket, into parallelism and prevent interference between the blades on the respective flights. Insofar as the upwardly curved portion 43 is provided on the leading edge of each cutter blade 31, as each cutter blade in one flight traverses a cutter blade of the adjacent flight in wiping contact therewith, the convexedly curved face of the curved portion 43 will ride over the corresponding face of the blade in the other flight as the two blades commence to cross one another, moving simultaneously in opposite directions. Thus as any two blades first commence to cross one another, these curved portions prevent the cutting edges of the blades from fouling or otherwise interfering with one another and thus becoming damaged.

By use of a precision roller chain guided in the manner described, it is possible to operate the mower with the blades travelling at a high linear sped, which ensures that stones and the like are not caught in the blades. The high linear speed of the cutters also enables the propelling vehicle to be driven at a higher speed and thus a greater area of pasture can be mowed in a given time than was previously possible.

I claim:

1. In an agricultural crop cutting implement for mowing grass and other crops, a support bar, means adapted to mount one end of the support bar on the implement to extend transversely of the direction of advancement of the implement, a pair of chain supporting members mounted on opposite ends of the support bar for rotation about substantially horizontal parallel axes transverse to the length of the bar, means for transmitting rotational driving movement to the support member which is at said one end of the support bar adjacent said mounting means, said latter support member having peripheral chain driving teeth, an endless chain on said support bar passing around said two rotatable supporting members to provide two chain flights disposed one above the other, said chain comprising a plurality of pairs of links connected pivotally together, rollers extending between the two links in a plurality of pairs of links and supported rotatably therefrom, said rollers being adapted for rolling engagement with said supporting member teeth, cutter blades on said chain links projecting forwardly of said support bar with the cutter blades of the respective chain flights disposed one above the other, a housing for said chain on said support bar extending between said rotatable supporting members, said housing having a slot extending longitudinally of the support bar with the cutter blades of the two flights projecting through said slot with the edge portions thereof in engagement with the upper and lower sides of the cutter blades of the upper and lower chain flights to maintain the cutter blades of the two flights in co-acting cutting engagement with one another.

2. In an agricultural crop cutting implement for mowing grass and other crops, a support bar, means adapted to mount one end of the support bar on the implement to extend transversely of the direction of advancement of the implement, a pair of chain supporting members mounted on opposite ends of the support bar for rotation about substantially horizontal parallel axes transverse to the length of the bar, means for transmitting rotational driving movement to the support member which is at said one end of the support bar adjacent said mounting means, said latter support member having peripheral chain driving teeth, an endless chain on said support bar passing around said two rotatable supporting members to provide two chain flights disposed one above the other, said chain comprising a plurality of pairs of links connected pivotally together, rollers extending between the two links in a plurality of pairs of links and supported rotatably therefrom, said rollers being adapted for rolling engagement with said supporting member teeth, cutter blades on said chain links projecting forwardly of said support bar with the cutter blades of the respective chain flights disposed one above the other, a guard extending around said toothed supporting member and having a crop parting portion extending beyond the support bar in the direction of advancement of the implement, said guard having an aperture in one lateral side thereof for the passage of the two flights of the chain, and a crop excluding member carried on said guard extending from the upper edge of said guard aperture immediately above the cutter blades on the upper of the two flights of the chain.

3. In an agricultural crop cutting implement for mowing grass and other crops, a support bar, means adapted to mount one end of the support bar on the implement to extend transversely of the direction of advancement of the implement, a pair of chain supporting members mounted on opposite ends of the support bar for rotation about substantially horizontal parallel axes transverse to the length of the bar, means for transmitting rotational driving movement to the support member which is at said one end of the supoprt bar adjacent said mounting means, said latter support member having peripheral chain driving teeth, an endless chain on said support bar passing around said two rotatable supporting members to provide two chain flights disposed one above the other, said chain comprising a plurality of pairs of links connected pivotally together, rollers extending between the two links in a plurality of pairs of links and supported rotatably therefrom, said rollers being adapted for rolling engagement with said supporting member teeth, cutter blades on said chain links projecting forwardly of said support bar with the cutter blades of the respective chain flights disposed one above the other, a housing for said chain on said support bar extending between said rotatable supporting members, said housing having a slot extending longitudinally of the support bar with the cutter blades of the two flights projecting through said slot with the edge portions thereof in engagement with the upper and lower sides of the cutter blades of the upper and lower chain flights to maintain the cutter blades of the two flights in co-acting cutting engagement with one another, a guard extending around said toothed supporting member and having a crop parting portion extending beyond the support bar in the direction of advancement of the implement, said guard having an aperture in one lateral side thereof for the passage of the two flights of the chain, a crop excluding member carried on said guard extending from the upper edge of said guard aperture immediately above the cutter blades on the upper of the two flights of the chain, and said crop excluding member forming an extension of the upper portion of said chain housing.

4. In an agricultural crop cutting implement for mowing grass and other crops, a support bar, means adapted to mount one end of the support bar on the implement to extend transversely of the direction of advancement of the implement, a pair of chain supporting members mounted on opposite ends of the support bar for rotation about substantially horizontal parallel axes transverse to the length of the bar, means for transmitting rotational driving movement to the support member which is at said one end of the support bar adjacent said mounting means, said latter support member having peripheral chain driving teeth, an endless chain on said support bar passing around said two rotatable supporting members to provide two chain flights disposed one above the other, said chain comprising a plurality of pairs of links connected pivotally together, rollers extending between the two links in a plurality of pairs of links and supported rotatably therefrom, said rollers being adapted for rolling engagement with said supporting member teeth, cutter blades on said chain links projecting forwardly of said support bar with the cutter blades of the respective chain flights disposed one above the other, a guard extending around said toothed supporting member and having a crop parting portion extending beyond the support bar in the direction of advancement of the implement, said guard having an aperture in one lateral side thereof for the passage of the two flights of the chain, and a crop excluding member carried on said guard extending from the upper edge of said guard aperture immediately above the cutter blades on the upper of the two flights of the chain, a curved guide member having a downwardly directed convex guide surface carried on said support bar adjacent said toothed supporting member above the upper flight of said chain, and said chain rollers having rolling engagement with said curved guide member.

5. An implement according to claim 1, wherein each cutter blade is provided with a guide portion which projects forwardly of the leading edge of the cutter blade in the designed direction of chain advancement, the guide portions of each of the blades of the one chain flight being adapted to co-act with the guide portions of each of the blades of the other chain flight in such a manner as to maintain the blades of the two flights in parallel traversing contact with one another without interference between the blades of the respective flights.

6. An implement according to claim 2, wherein each cutter blade is provided with a guide portion which projects forwardly of the leading edge of the cutter blade in the designed direction of chain advancement, the guide portions of each of the blades of the one chain flight being adapted to co-act with the guide portions of each of the blades of the other chain flight in such a manner as to maintain the blades of the two flights in parallel traversing contact with one another without interference between the blades of the respective flights.

References Cited in the file of this patent

UNITED STATES PATENTS

| | | |
|---|---|---|
| 1,353,891 | Cook | Sept. 28, 1920 |
| 2,291,182 | Blalack | July 28, 1942 |
| 2,941,345 | Schaeffer | June 21, 1960 |